US005666708A

United States Patent [19]

Vianello

[11] Patent Number: 5,666,708

[45] Date of Patent: Sep. 16, 1997

[54] DEVICE FOR FILLING SPACER FRAMES FOR INSULATING GLASS WITH HYGROSCOPIC MATERIAL

[75] Inventor: Fortunato Vianello, Vallio di Roncade, Italy

[73] Assignee: For.El. Base di Vianello Fortunato & C. S.n.c., Vallio di Roncade, Italy

[21] Appl. No.: 279,900

[22] Filed: Jul. 26, 1994

[30] Foreign Application Priority Data

Aug. 2, 1993 [IT] Italy ................................ TV93A0074

[51] Int. Cl.$^6$ ...................................................... B23P 13/02

[52] U.S. Cl. ............................................................ 29/33 K

[58] Field of Search ................................ 29/33 K, 527.1, 29/33 T, 33 R, 26 A; 52/302, 397; 156/109; 141/4

[56] References Cited

U.S. PATENT DOCUMENTS

| | | | |
|---|---|---|---|
| 4,407,105 | 10/1983 | Frank | 52/397 |
| 4,494,283 | 1/1985 | Lisec | 29/33 K |
| 4,670,954 | 6/1987 | Lisec | 29/33 K |
| 4,781,878 | 11/1988 | Lisec | 264/267 |
| 4,817,354 | 4/1989 | Bayer | 52/302 |
| 4,826,547 | 5/1989 | Lenhardt | 156/109 |
| 4,909,874 | 3/1990 | Rueckheim | 156/105 |
| 4,912,837 | 4/1990 | Bayer | 29/33 K X |
| 4,945,619 | 8/1990 | Bayer | 29/33 R |
| 4,947,537 | 8/1990 | Lisec | 29/33.7 X |
| 5,080,146 | 1/1992 | Arasteh | 141/4 |
| 5,253,683 | 10/1993 | Ekren et al. | 29/527.1 X |

FOREIGN PATENT DOCUMENTS

| | | |
|---|---|---|
| 377751 | 4/1985 | Austria . |
| 8519191 | 8/1985 | Germany . |
| 9104994 | 7/1991 | Germany . |
| 9210635 | 6/1992 | WIPO . |

*Primary Examiner*—William R. Briggs

*Attorney, Agent, or Firm*—Guido Modiano; Albert Josif

[57] ABSTRACT

Device for filling spacer frames for insulating glass with hygroscopic material, the frames comprising a first wall and a second wall that lie respectively outside and inside the insulating glass and two third side walls arranged adjacent to the glass sheets forming the insulating glass. The device comprises first means for forming at least one opening at the second inner wall of the frame and second means for inserting the hygroscopic material. There are also third means which seal the opening formed on the second inner wall.

13 Claims, 5 Drawing Sheets

DEVICE FOR FILLING SPACER FRAMES FOR INSULATING GLASS WITH HYGROSCOPIC MATERIAL

BACKGROUND OF THE INVENTION

The present invention relates to a device for filling spacer frames for insulating glass with hygroscopic material.

Said spacer frames usually comprise hollow profiled bars which are usually joined at one or more corners by means of angles made of plastics or metal.

Said frames thus have a first wall lying externally to the insulating glass, a second wall arranged inside the insulating glass, and two third lateral walls arranged adjacent to the glass sheets that form the insulating glass.

Hygroscopic material must be poured inside the spacer frames, and adapted holes are formed at the second inner wall so as to maintain the required degree of humidity inside the insulating glass.

For this purpose, it is known to manufacture spacer frames which are appropriately folded on three sides, leaving the ends adjacent at one corner disconnected and particularly so that one of the two ends is not folded and thus protrudes beyond the perimetric edge of the other one.

This allows to load the hygroscopic material on two sides of the frame, i.e. al the sides whose ends are free: once this operation has been performed, one of the two ends is folded and connected to the other by means of an adapted metal or plastic insert.

However, this method has considerable drawbacks: first of all the frame is loaded with hygroscopic material only at two of its four sides and after filling it is furthermore necessary to perform additional work steps that can for example cause the accidental loss of part of this hygroscopic material.

As a partial solution to these drawbacks, it is known to manufacture frames that are again folded so as to form a geometrical shape that is open at one corner; an L-shaped closing insert can be associated at the free ends.

The hygroscopic material is again loaded before assemblying the L-shaped insert; however, even this solution has the drawbacks mentioned above and thus allows to fill the frame with hygroscopic material only on two sides, with the additional drawback due to the difficulty of hermetically sealing the frame at the corner even when it is sealed with a local injection of butyl.

Furthermore, should one wish to fill each individual side of the frame with hygroscopic material, the frame would have to be formed by multiple elements that were subsequently mutually associable by using angular inserts that allow coupling to the following side.

Even this solution, however, would not be optimum, since on one hand it would not be possible to seal the frame hermetically at its corners, even by injecting butyl locally, and furthermore there would be an excessive time interval between the loading of the hygroscopic material and the coupling of the frame to the glass sheets.

Furthermore, an excessive manual work would be required to assemble the composite frame, i.e. a frame whose sides are joined at their ends by means of angular inserts.

Italian patent no. 1190881, filed on Jun. 22, 1982 as application no. 21991 A/82, is also known among the known art: this patent discloses a device for filling spacer frames with hygroscopic material, whose purpose is to allow the final and permanent filling of spacer frames which are already folded and thus closed.

This is achieved by means of a device that forms an opening in the outer wall of the spacer frame; the hygroscopic material is introduced through this opening, which is sealed by means of a welding tip.

However, even this solution has drawbacks due to the use of multiple devices, including a welding machine which has considerable problems since welding must be performed on a frame having a very limited thickness.

Accordingly, there is the problem of hermetically welding this hole, also bearing in mind that any application of material alters the flatness of the outer surface of the frame, which must be maintained as much as possible in order to subsequently apply sealant optimally.

As a partial solution to this drawback one might think to form a seal, at the hole formed on the outer wall of the frame, not with a welding machine but for example with butyl; however, this solution would in any case have drawbacks, due to the difficulty of sealing the hole at its thickness, unless an overabundant amount of sealant (which depends anyway on the size of the profile) is injected or unless holes provided with a collar are formed with great difficulty.

There is accordingly the risk of not achieving frame flatness at the injection hole formed on the outer wall.

A discontinuity would also be produced on said outer wall of the frame, on which a second seal must be subsequently performed, and this would entail discontinuities and problems in applying the bead of sealant at the opening.

It is also known to manufacture a frame in a closed shape, on which holes are subsequently produced at the side walls which are then arranged adjacent to the glass sheets forming the insulating glass.

Even this solution has drawbacks, since there is still the problem linked to the need to seal said holes, with the consequent observed presence of discontinuities during the application of the first seal, if provided; these discontinuities are worsened when the side walls provided with the holes must be pressed at the glass sheets forming the insulating glass.

In fact it has been observed that during the application of the sealant said sealant may become interrupted at the hole, causing the frame to be no longer hermetically sealed.

It should in fact be noted that the frame must be permeable to air only at the wall lying inside the insulating glass.

SUMMARY OF THE INVENTION

A principal aim of the present invention is therefore to solve the described technical problems, eliminating the drawbacks of the known art and thus providing a device that allows to fill spacer frames for insulating glass with hygroscopic material while maintaining a perfectly hermetic seal for the frame with respect to the environment outside the insulating glass.

Within the scope of the above aim, an important object is to provide a device that allows to optimally fill the various portions forming the frame with hygroscopic material.

Another important object is to obtain a device that allows the easy filling of all the sides of the frame with hygroscopic material and avoids the use of welding machines or the application of sealant, such as butyl, at the holes for introducing the hygroscopic material.

Another important object is to provide a device that allows to maintain optimum flatness of the frame walls that are affected by the external seal and interact with the surfaces of the sheets forming the insulating glass.

Another object is to provide a device which is reliable and safe in use and has low manufacturing costs.

With this aim, these objects and others in view, there is provided, according to the present invention, a device for filling spacer frames for insulating glass with hygroscopic material, said frames comprising a first wall and a second wall that lie respectively outside and inside said insulating glass and two third side walls arranged adjacent to the glass sheets forming said insulating glass, characterized in that it comprises: first means for forming at least one opening at said second inner wall of said frame; second means for inserting said hygroscopic material; and third means for sealing said at least one opening.

BRIEF DESCRIPTION OF THE DRAWINGS

Further characteristics and advantages of the device according to the invention will become apparent from the following detailed description of a particular but not exclusive embodiment thereof, illustrated only by way of non-limitative example in the accompanying drawings, wherein.

DESCRIPTION OF THE PREFERRED EMBODIMENTS

Figure 1:
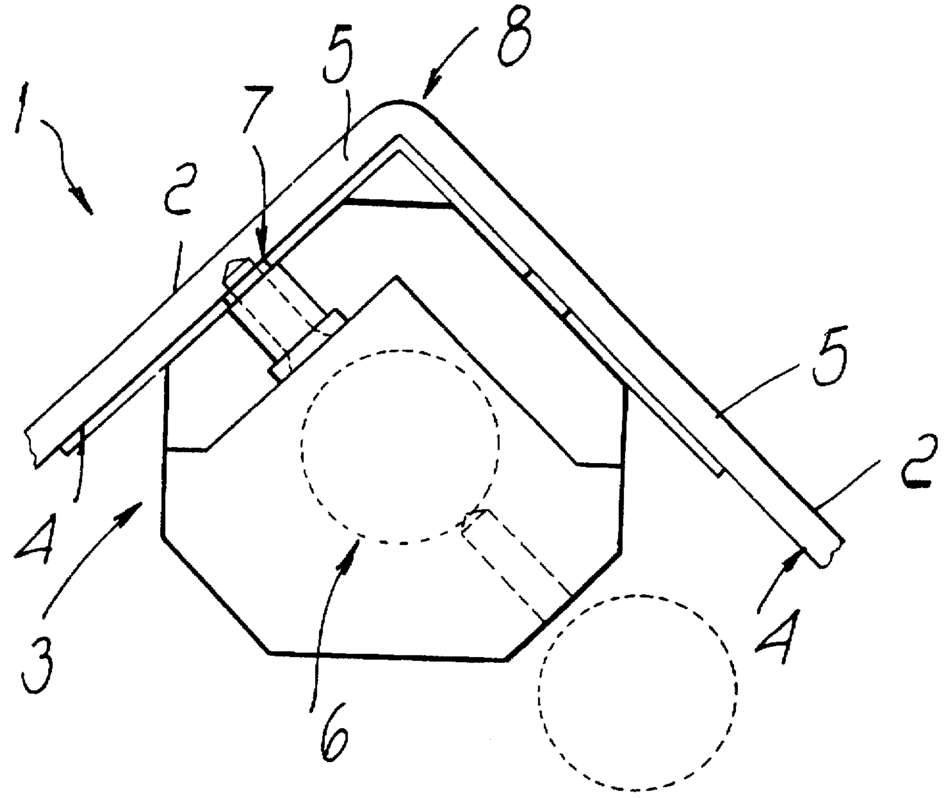
FIG. 1 is a schematic view of a corner of a spacer frame with the first means for forming an opening at the second inner wall of said frame.
Figure 2:
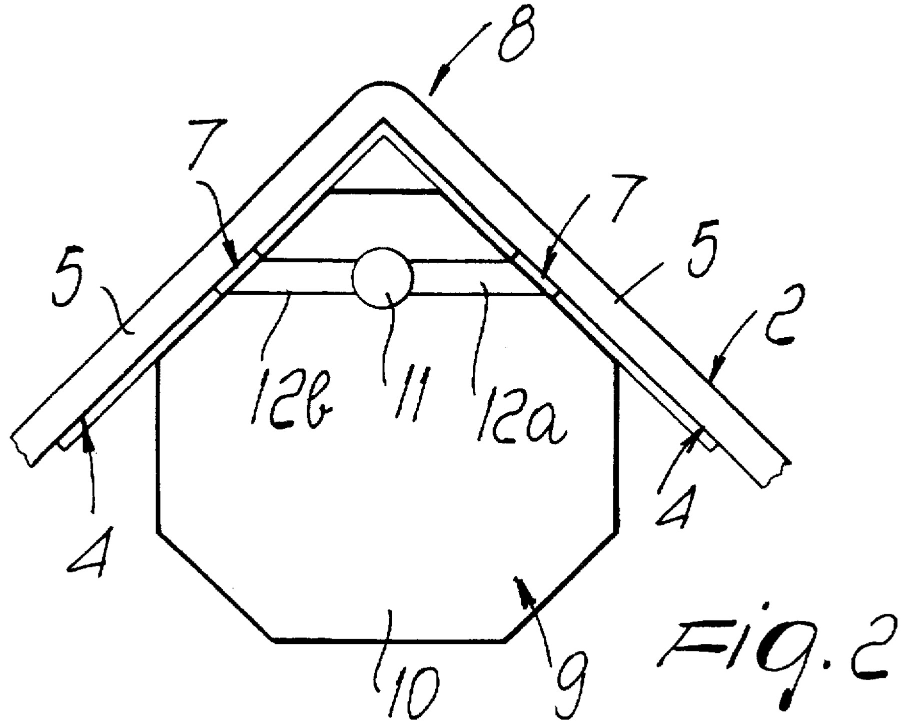
FIG. 2 is a view, similar to FIG. 1, of the second means for filling the sides of the frame with hygroscopic material.

With reference to the above figures, the reference numeral 1 designates a spacer frame for insulating glass, which is manufactured with a known technology and thus for example by bending a hollow profiled bar and joining to from a continuous closed piece.

The hollow frame 1 comprises two lateral walls 5 each upon which a surface of a respective glass sheet of a pair of glass sheets may interact and be coupled so as to form the insulating glass. When the glass sheets are coupled to the frame at the walls 5, a chamber 3 of the insulating glass is formed between the pair of glass sheets and the frame 1.

The reference numeral 2 designates a first or outer wall of the hollow frame 1 which is arranged outside with respect to the chamber 3, and the reference numeral 4 designates a second or inner wall of the hollow frame 1 which delimits the chamber 3 together with the pair of glass sheets.

The device for filling said frames, also termed spacer frames, with hygroscopic material comprises first means 6 for forming at least one opening 7 at the inner wall 4.

Said first means 6 are constituted for example by mechanical means such as a mill or by thermal means such as for example a laser.

Advantageously, multiple openings 7 are formed at the inner wall and particularly in a region adjacent to the corners 8 of said frame 1.

The device furthermore comprises second means 9 for inserting the hygroscopic material at the openings 7; said second means are constituted for example by a tool 10 having a first salt feeding duct 11 which is connected to second ducts **12*a* and 12*b* whose free ends can be arranged at the openings 7**.

The device furthermore comprises third means 13 for sealing the openings 7; said third means are constituted for example by hollow heads 14 which internally contain an elastically deformable element 15 such as for example a plug which preferably has a spherical shape.

As an alternative, the shape of the plug may be the most suitable according to the specific requirements.

A pusher 16 is furthermore present inside the heads 14 and has the purpose of pushing the elastically deformable element 15 through a hopper 17 at the opening 7.

The hopper can slide axially with respect to the head 14 so that it can arrange itself, as will also become apparent hereinafter, partially inside the frame during the insertion of the elastically deformable element, in order to prevent said elastically deformable element from making contact with the edge of the opening 7, since it would deform it.

The elastically deformable element 15 is inserted into the frame 1 according to the sequence shown in FIGS. 4, 5, 6, 7 and 8: initially the pusher 16 in fact pushes the elastically deformable element 15 through the axially sliding hopper 17 which compresses it elastically, allowing its insertion into the frame 1 through the opening 7 after the hopper 17 has entered the protective plate 23 which is interposed to avoid damage to the spacer frame.

Once the elastically deformable element has passed the perimetric edge 18 at the tip of the hopper 17, which is thus located at a plane lying inside the frame 1, said element tends to resume its shape, expanding inside said frame 1.

Figure 3:
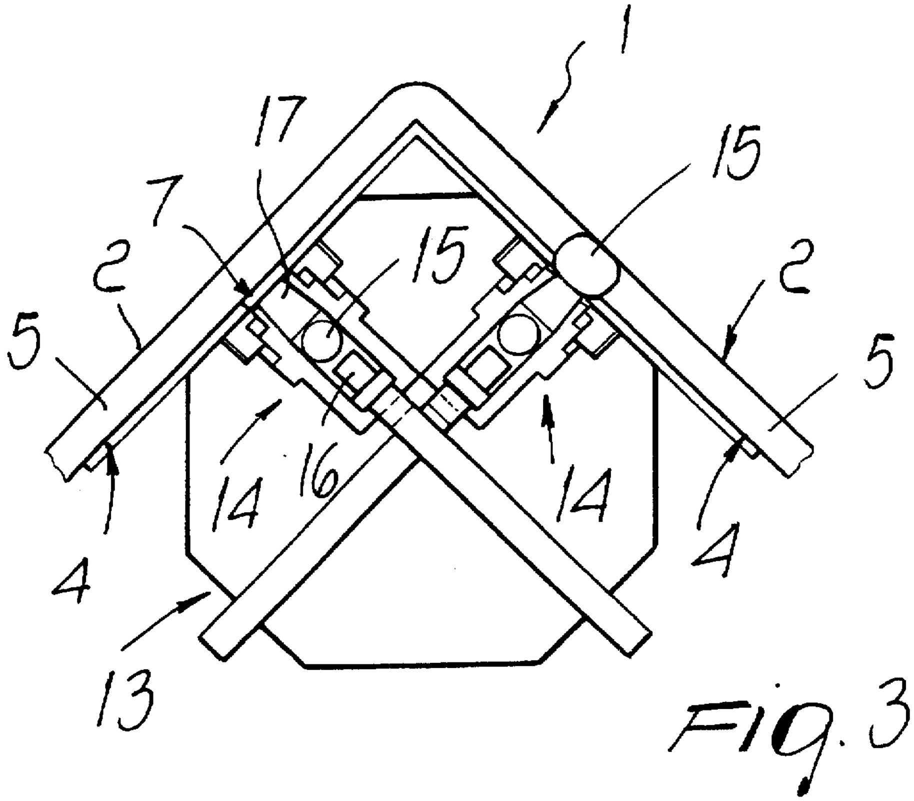
FIG. 3 is a view, similar to FIG. 2, of the third means for sealing the openings formed in the frame.
Figure 4:
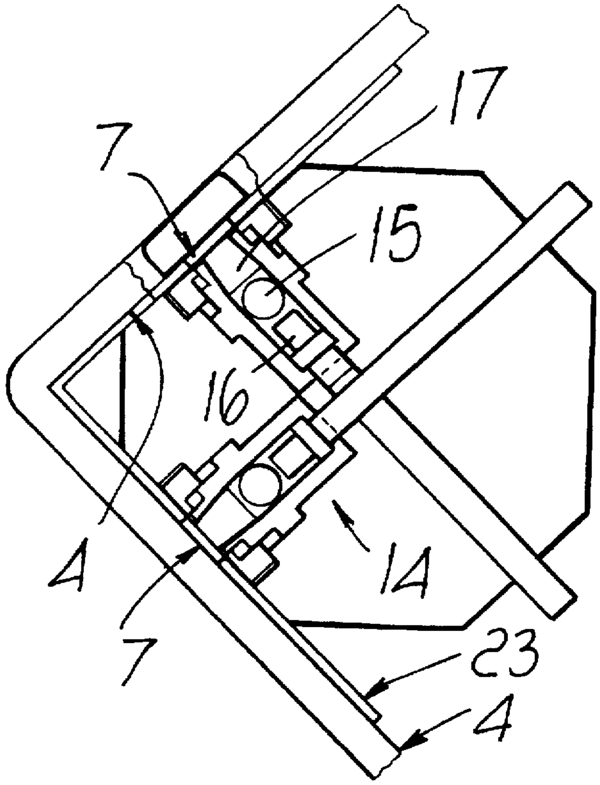
FIG. 4 is a view, similar to FIG. 3, of part of the frame, wherein for the sake of clarity the cross-section has been reversed at the opening, and of the means for sealing said opening during a step that precedes sealing.
Figure 5:
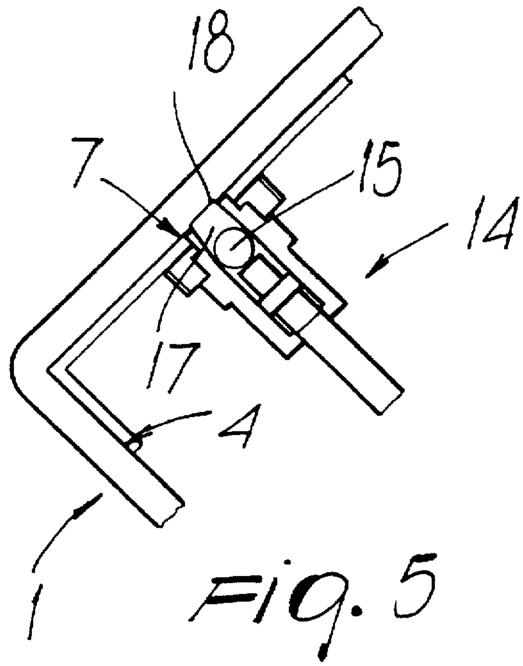
FIGS. 5, 6, 7 and 8 illustrate the various sequences by means of which the opening is sealed.
Figure 6:
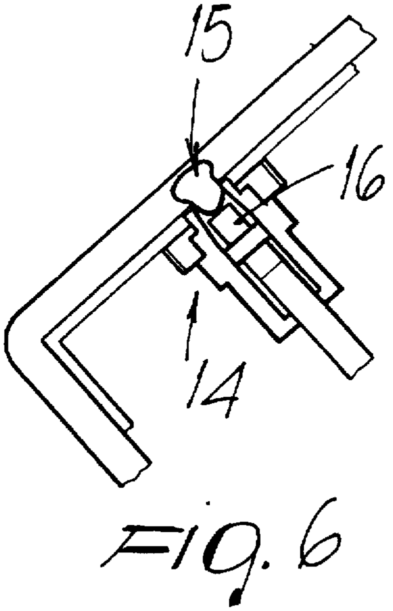
Figure 7:
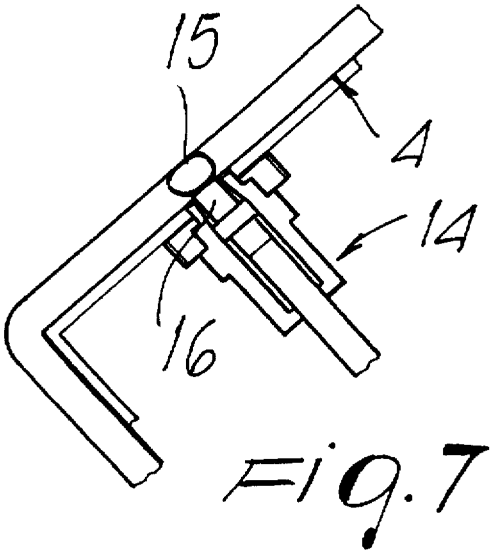
Figure 8:
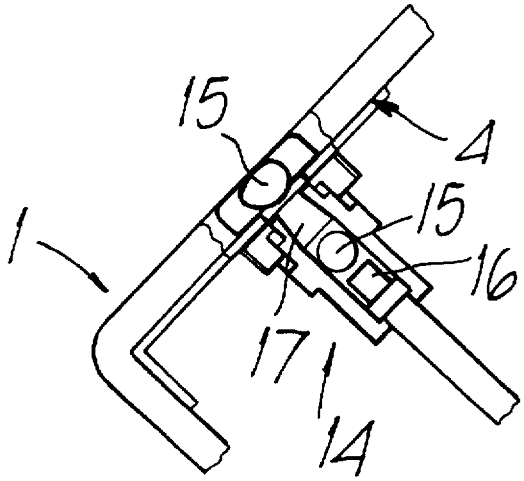

Once the thrust of the pusher 17 has ended, and once said pusher has retracted into the head 14, the elastically deformable element 15 expands fully and has such dimensions that, once it has fully expanded, it closes the opening 7, as shown for example in FIG. 3.

The device thus allows to close the openings 7, obtaining a frame which is hermetically closed at the first outer wall and at the walls 5 that lie laterally with respect to the insulating glass.

This allows to achieve optimum coupling of the frame to the glass sheets forming the insulating glass and to perform optimum sealing of the lateral walls 5 (first sealing) and of the first outer wall 2 (second sealing).

It has thus been observed that the invention has achieved the intended aim and objects, eliminating the technical problems mentioned above and solving the drawbacks of the mentioned known art, since the device according to the invention allows to rapidly and easily fill a frame, optionally already shaped or closed or with one or more open sides, with hygroscopic material, obtaining an optimum sealing of the openings formed on the inner wall of said frame.

Furthermore, by not acting on the first outer wall or on the lateral walls of the frame, said device allows said walls to maintain optimum flatness for the subsequent operations for coupling to the glass sheets and for perimetric sealing (particularly for the lateral walls 5).

Figure 9:
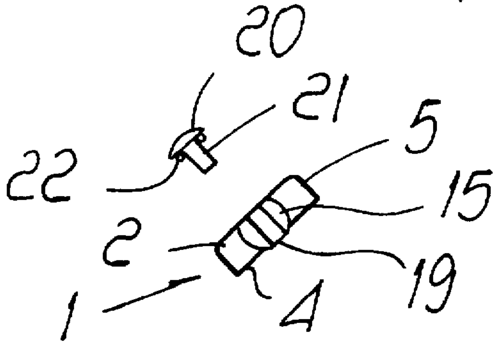
FIG. 9 is a detail view of a possible embodiment.
Figure 10:
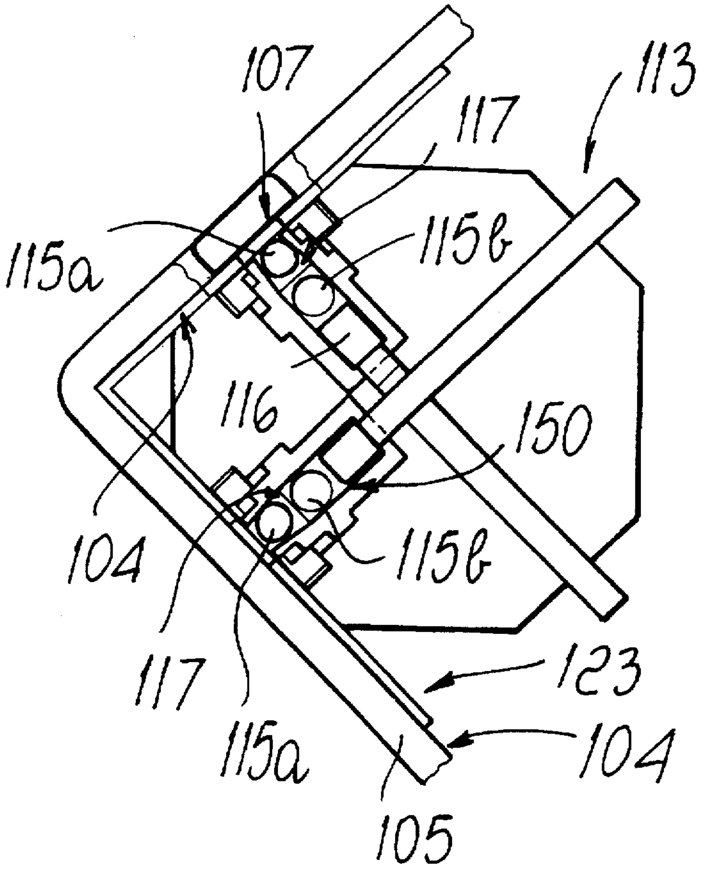
FIGS. 10, 11, 12, 13 and 14 illustrate, in various sequences, how to seal the opening in a different embodiment.
Figure 11:
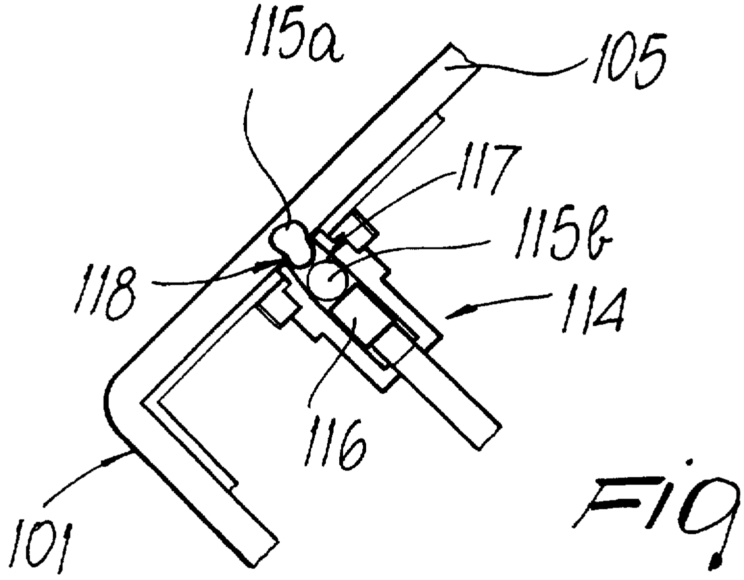
Figure 12:
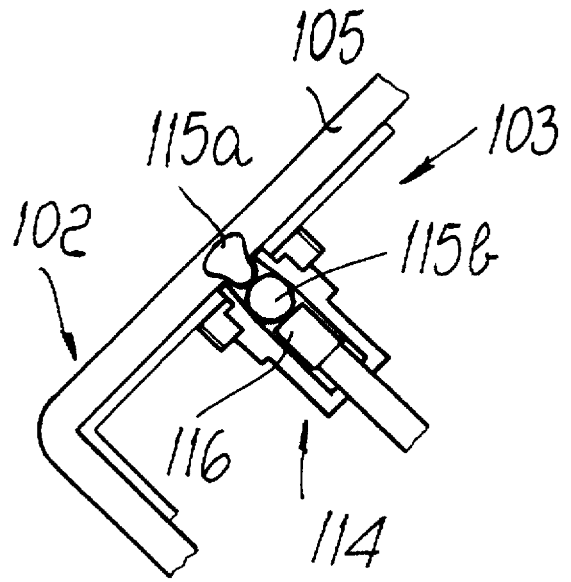
Figure 13:
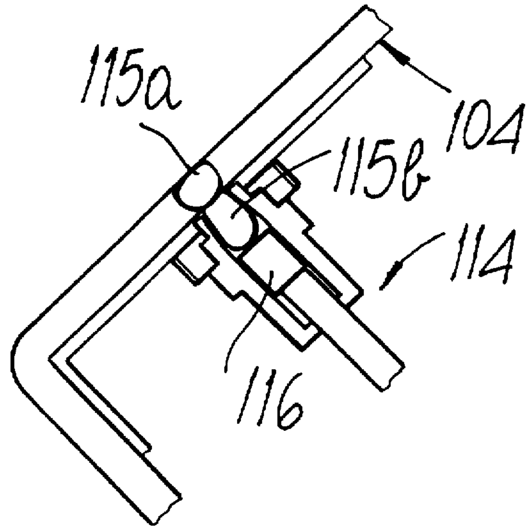
Figure 14:
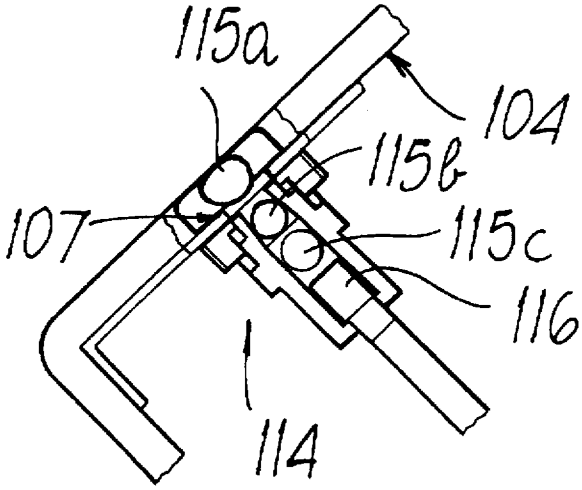

FIG. 9 illustrates an additional application, which consists in making a hole 19 in the elastically deformable element 15 as well as in the first outer wall 2 prior to the coupling of the insulating glass, for the optional injection of gas into the internal chamber.

Said hole 19, as well as the hole formed on the first outer wall 2, can be closed by using a suitable mushroom-shaped plug 20; a sealing element 22, such as an O-ring, or sealant, can be interposed coaxially to the stem 21 of said plug.

The invention is naturally susceptible to numerous modifications and variations, all of which are within the scope of the same inventive concept.

Thus, for example, FIGS. 10 to 14 illustrate another embodiment of a spacer frame 101 for an insulating glass. The spacer frame comprises two lateral walls 105 each upon which a surface of a respective glass sheet of a pair of glass sheets may interact and be coupled so as to form the insulating glass. When the glass sheets are coupled to the frame at the walls 105, a chamber 103 of the insulating glass is formed between the pair of glass sheets and the frame 101.

The reference numeral 102 designates a first or outer wall of the hollow frame 101 which is arranged outside with respect to the chamber 103, and the reference numeral 104 designates a second or inner wall of the hollow frame 101 which delimits the chamber 103 together with the pair of glass sheets.

The device for filling said frames with hygroscopic material comprises first means for forming at least one opening 107 at the inner wall 104, and second means for inserting the hygroscopic material at the openings 107; both means are of the previously described type.

The device also comprises third means 113 for sealing the openings 107; said third means comprise hollow heads 114 which internally contain a first and a second elastically deformable elements, designated by the reference numerals **115*a* and 115*b***, such as for example a plug which preferably has a spherical shape.

A cylindrical chamber 150 is formed within the heads 114 and internally contains a complementarily shaped pusher 116; the function of said pusher is to push, one at a time, the two elastically deformable elements **115*a* and 115*b*, through a hopper 117 at the opening 107**.

The first elastically deformable element **115*a* which faces the opening 107 is inserted into the frame 101 according to the sequence shown in FIGS. 10, 11, 12, 13 and 14: initially the pusher 116 pushes the second elastically deformable element 115*b*, against the first elastically deformable element 115*a*, which is forced through the hopper 117 which elastically compresses it, allowing its insertion, through the opening 107, into the frame 101 after the hopper 117 has entered the protective plate 123** which is interposed to avoid damage to the spacer frame.

After passing beyond the perimetric edge 118 of the tip of the hopper 117, which thus lies at a plane internal to the frame 101, the first elastically deformable element **115*a* tends to regain its shape, expanding inside said frame 101**.

Once the thrust of the pusher 106 has ended, and once said pusher has retracted inside the head 114, the second elastically deformable element **115*b* is ready for insertion through the opening 117, whereas a third elastically deformable element 115*c* interposes itself, by virtue of a suitably equipped loader magazine, between said second elastically deformable element and the pusher 106**, allowing to restart the cycle.

The presence of the first and second elastically deformable elements allows to prevent the pusher from driving itself, during pushing, into the one which is going to be accommodated within the frame 101.

The materials and the dimensions which constitute the individual components of the device may naturally be the most pertinent according to the specific requirements.

What is claimed is:

1. Apparatus for filling a hollow spacer frame for insulating glass with hygroscopic material wherein said spacer frame is bent and joined to form a continuous closed piece, and wherein the spacer frame comprises: a pair of opposite wall portions to each of which is connectable a respective glass sheet of a pair of glass sheets such as to form an insulating glass chamber between the glass sheets and the continuous closed spacer frame; an inner wall portion extending between said opposite wall portions such as to delimit said chamber together with said pair of glass sheets when said pair of glass sheets are connected to said pair of opposite wall portions; and an outer wall portion extending between said opposite wall portions such as to be arranged outside with respect to said chamber when said pair of glass sheets are connected to said pair of opposite wall portions; wherein the apparatus comprises:
   - a device for forming at least one opening at said inner wall portion of said bent and continuous closed spacer frame;
   - a device for inserting hygroscopic material inside said hollow spacer frame through said at least one opening; and
   - a device for sealing said at least one opening after hygroscopic material has been inserted therethrough.

2. The apparatus of claim 1 wherein said device for sealing said at least one opening comprises at least one elastically deformable element and at least one pusher for engaging said at least one elastically deformable element and inserting the engaged elastically deformable element through said at least one opening while the engaged elastically deformable element deforms elastically and subsequently into the hollow spacer frame.

3. The apparatus of claim 2 wherein said device for sealing said at least one opening further comprises at least one hollow head device for slidably accommodating a respective one of said at least one pusher and said at least one elastically deformable element.

4. The apparatus of claim 3 wherein said device for sealing said at least one opening further comprises at least one converging hopper arrangeable in said at least one opening for elastically deforming said at least one elastically deformable element passing through said at least one converging hopper.

5. The apparatus of claim 4 wherein said at least one converging hopper is slidably supported in said at least one hollow head device.

6. The apparatus of claim 1 wherein said device for forming at least one opening at said inner wall portion of said spacer frame is adapted for forming a first opening in a first leg of said spacer frame and for forming a second opening in a second leg of said spacer frame which is bent at an angle with respect to said first leg.

7. The apparatus of claim 6 wherein said device for inserting hygroscopic material inside said hollow spacer frame through said at least one opening comprises a duct system for simultaneously inserting hygroscopic material through said first and second openings.

8. The apparatus of claim 2 wherein said at least one elastically deformable element comprises a sealable hole extending through said at least one elastically deformable element.

9. Apparatus for filling a hollow spacer frame for insulating glass with hygroscopic material wherein said spacer frame is bent and joined to form a continuous closed piece, and wherein the spacer frame comprises: a pair of opposite wall portions to each of which is connectable a respective glass sheet of a pair of glass sheets such as to form an insulating glass chamber between the glass sheets and the continuous closed spacer frame; an inner wall portion extending between said opposite wall portions such as to delimit said chamber together with said pair of glass sheets when said pair of glass sheets are connected to said pair of opposite wall portions; and an outer wall portion extending between said opposite wall portions such as to be arranged outside with respect to said chamber when said pair of glass sheets are connected to said pair of opposite wall portions; wherein the apparatus comprises:

means for forming at least one opening at said inner wall portion of said bent and continuous closed spacer frame;

means for inserting hygroscopic material inside said hollow spacer frame through said at least one opening; and means for sealing said at least one opening after hygroscopic material has been inserted therethrough.

10. The apparatus of claim 9 wherein said means for sealing said at least one opening comprise at least one elastically deformable element and pusher means for engaging said at least one elastically deformable element and inserting the engaged elastically deformable element through said at least one opening while the engaged elastically deformable element deforms elastically and subsequently into the hollow spacer frame.

11. The apparatus of claim 10 wherein said means for sealing said at least one opening further comprise converging hopper means arrangeable in said at least one opening for elastically deforming said at least one elastically deformable element passing through said converging hopper means.

12. The apparatus of claim 9 wherein said means for forming at least one opening at said inner wall portion of said spacer frame is adapted for forming a first opening in a first leg of said spacer frame and for forming a second opening in a second leg of said spacer frame which is bent at an angle with respect to said first leg.

13. The apparatus of claim 12 wherein said means for inserting hygroscopic material inside said hollow spacer frame through said at least one opening comprises duct means for simultaneously inserting hygroscopic material through said first and second openings.

* * * * *